(12) United States Patent
Hung-Jang

(10) Patent No.: US 6,405,981 B1
(45) Date of Patent: Jun. 18, 2002

(54) ROLLER TYPE SUPPORT FRAME STRUCTURE

(75) Inventor: Chen Hung-Jang, Taipei (TW)

(73) Assignee: Palmgren Industrial Corp, Ltd., Taichung Hsien (TW)

( * ) Notice: Subject to any disclaimer, the term of this patent is extended or adjusted under 35 U.S.C. 154(b) by 0 days.

(21) Appl. No.: 09/549,401

(22) Filed: Apr. 14, 2000

(51) Int. Cl.[7] .................................................. A47F 5/00
(52) U.S. Cl. .............................. 248/125.2; 242/599.3; 248/354.3
(58) Field of Search .................................. 248/158, 130, 248/125.2, 519, 521, 214, 264, 425, 200.1, 351, 354.3; 242/598.3, 599.3, 405.3

(56) References Cited

U.S. PATENT DOCUMENTS

| | | | | |
|---|---|---|---|---|
| 3,357,654 A | * | 12/1967 | Losman et al. | 242/405.3 |
| 4,522,348 A | * | 6/1985 | Strout et al. | 242/422.1 |
| 4,732,345 A | * | 3/1988 | Golden | 242/598.3 |
| 5,482,226 A | * | 1/1996 | Choate | 242/588 |
| 5,568,864 A | * | 10/1996 | Nathan | 242/599.3 X |
| 5,651,510 A | * | 7/1997 | Eble et al. | 242/599.3 X |
| 5,991,963 A | * | 11/1999 | Tourigny | 242/599.3 X |
| 6,056,234 A | * | 5/2000 | Kim | 242/598 |
| 6,113,054 A | * | 9/2000 | Ma | 248/158 X |
| 6,145,771 A | * | 11/2000 | Santa Cruz et al. | 242/598.3 X |

* cited by examiner

Primary Examiner—Anita King
Assistant Examiner—Tan Le
(74) Attorney, Agent, or Firm—Charles E. Baxley

(57) ABSTRACT

A roller type support frame structure includes a body connected to a post. Two end pieces respectively extend from the body and one of the end piece has a threaded hole and the other end piece has a hole defined therethrough. A core has a threaded outside for being threadedly engaged with the threaded hole, and an insertion section of the core is inserted into the hole of the second end piece. A sleeve is rotatably mounted to the core.

2 Claims, 4 Drawing Sheets

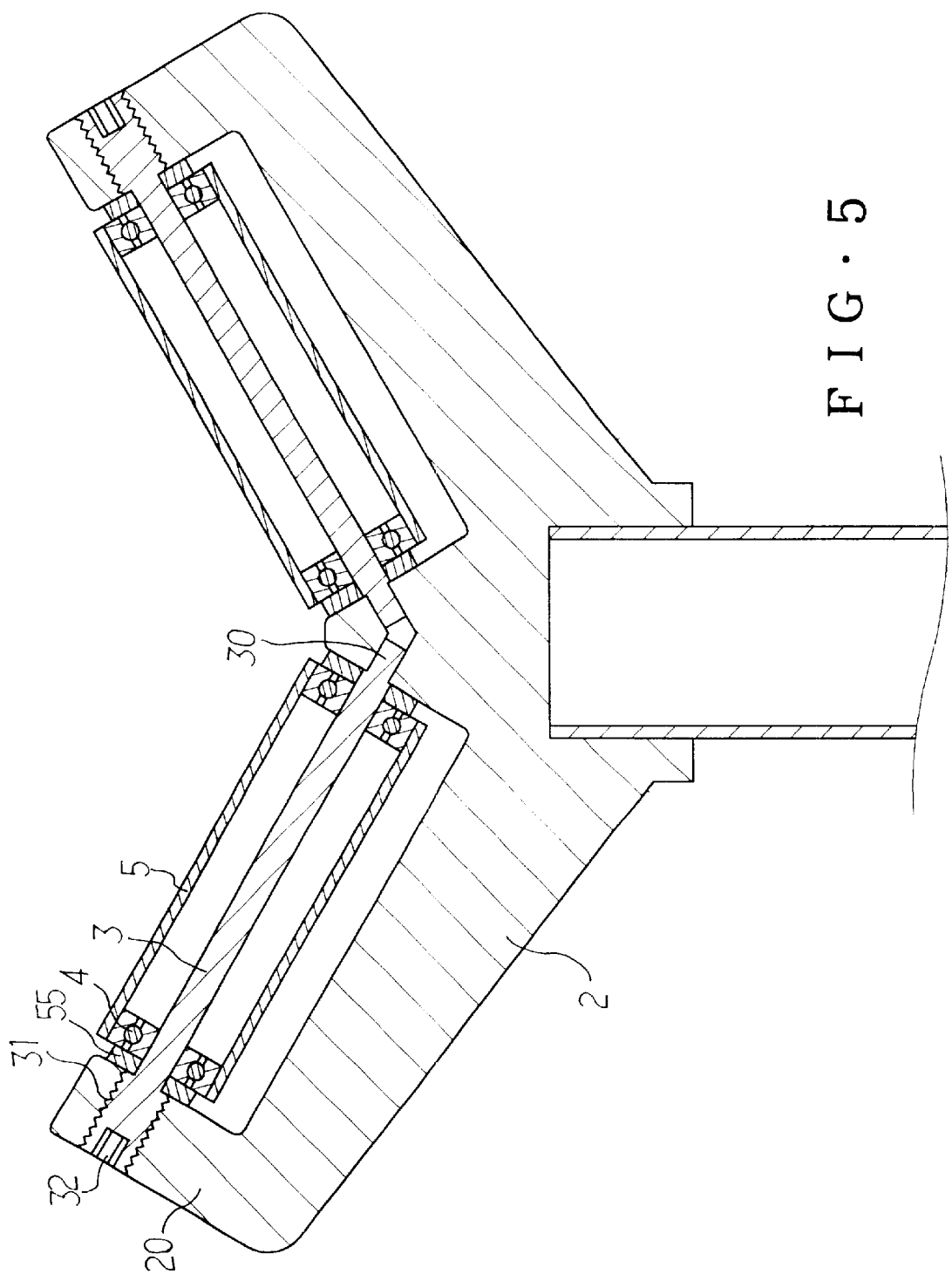

ROLLER TYPE SUPPORT FRAME STRUCTURE

FIELD OF THE INVENTION

The present invention relates to a roller type support frame that as a frame with two end pieces between which a roller is connected. One of the two end pieces has a threaded hole and the other end piece has a plain hole so that a core is easily and firmly connected between the two end pieces.

BACKGROUND OF THE INVENTION

A conventional roller type support frame for support a heavy and long object is disclosed in FIGS. 1 and 2 and generally includes a frame 10 with a handle 100 extending from a mediated portion of the frame 10. Two end pieces 101 are extending from the frame 10 and toward to an opposite direction of the handle 100. Each end piece 101 has a semi-circular recess 102 and two threaded holes 103 defined in a top thereof wherein the semi-circular recess 102 is located between the two threaded holes 103. Two caps 11 are respectively mounted to the tops of the two end pieces 101 by bolts 15 which extend through passages 111 in the caps 11 and. engaged with the threaded holes 103. Each cap 11 has a semi-circular recess 110 defined in a bottom thereof so that two ends 120 of a core 12 are retained between the two semi-circular recesses 110 of the jointed cap 11 and the end piece 101. Two bearings 13 are mounted to the core 12 and a sleeve 14 is mounted to the two bearings 13. It takes a lot of manufacturing time to made the semi-circular recess 102 and the threaded holes 103 in each of the end pieces 101. The two caps 11 are also incurred the same problems. Furthermore, the bolts 15 could be loosened from the end pieces 101 by vibration.

The present invention intends to provide a roller frame structure that has a simple structure and the core is firmly connected between the two end pieces.

SUMMARY OF THE INVENTION

In accordance with one aspect of the present invention, there is provided a roller type support frame structure and comprising a body having a neck for being connected to a post. A first end piece and a second end piece respectively extend from the body. The first end piece has a threaded hole defined in a side facing the second end piece, and the second end piece has a hole defined therethrough. A core has a first end with a threaded outside and a second end of the core has an insertion section which is inserted into the hole of the second end piece. The threaded outside is engaged with the threaded hole in the first end piece. A sleeve is rotatably mounted to the core.

The object of the present invention is to provide a roller type support frame wherein the connection of the core and the end pieces is strong and the core will not be loosened by vibration.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 5 is a side elevational view, partly in section, of another embodiment of the roller type support frame of the present invention.

DETAILED DESCRIPTION OF THE PREFERRED EMBODIMENTS

Figures 1, 2:
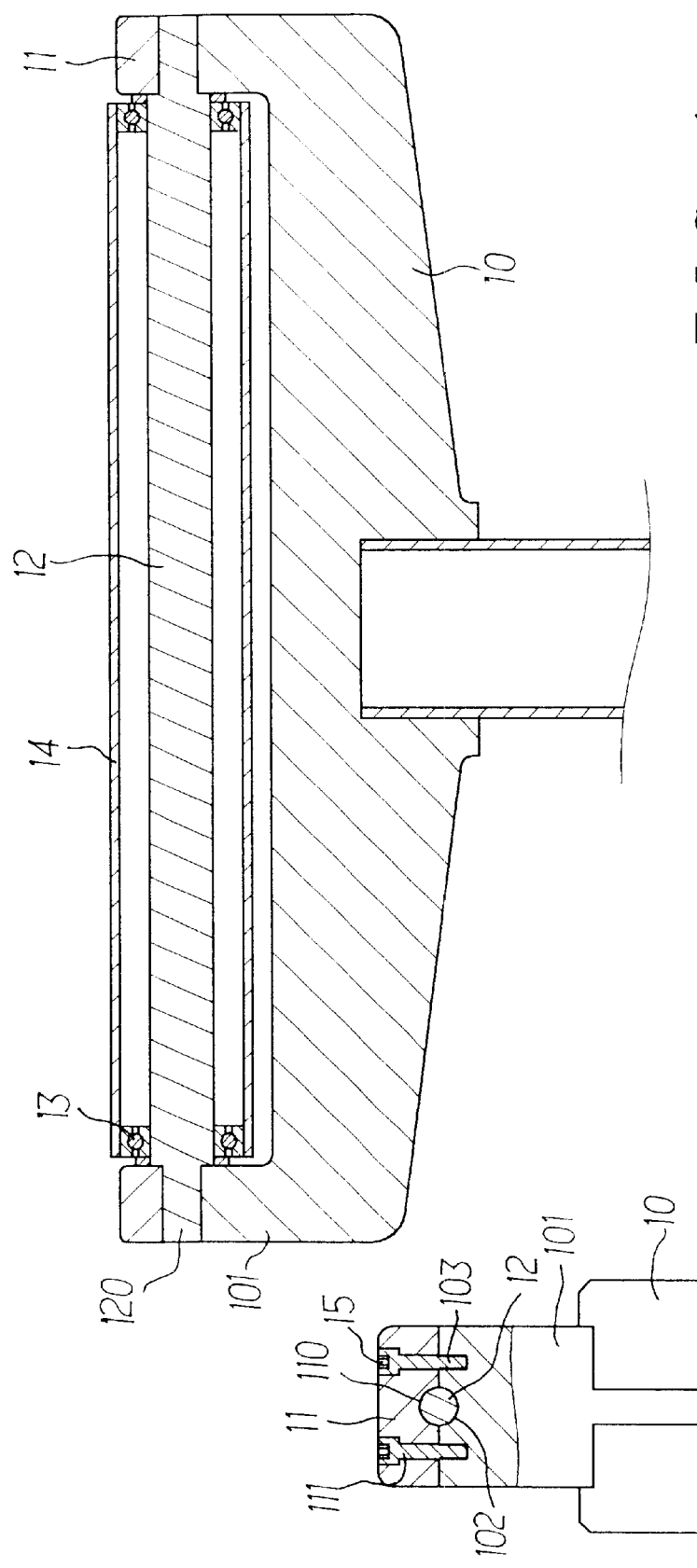
FIG. 1 is a side elevational view, partly in section, of a conventional roller type support frame.
FIG. 2 is an end cross-sectional view to show a connection between a cap, an end piece and a core of the conventional roller type support frame.
Figure 3:
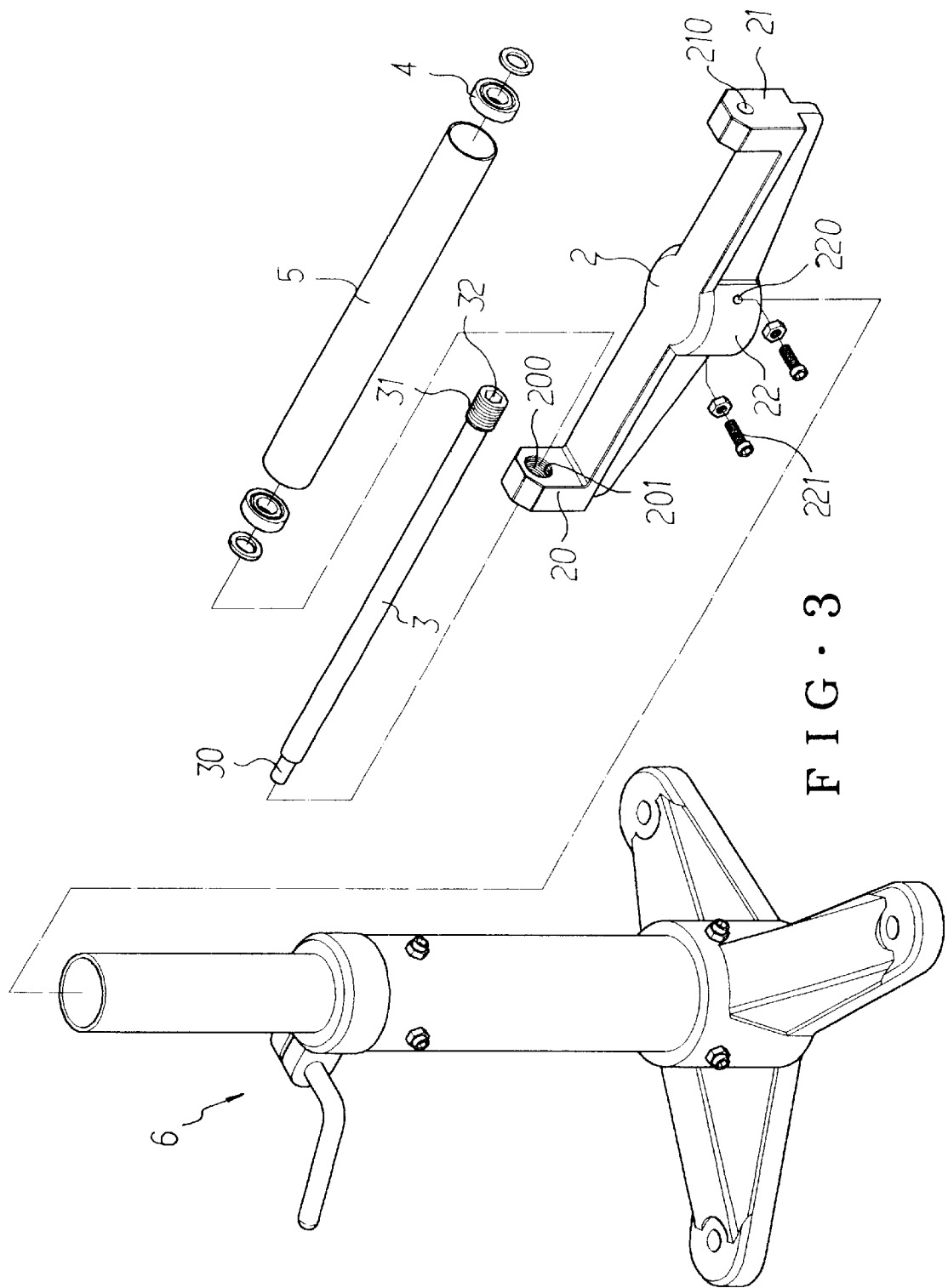
FIG. 3 is an exploded view to show a roller type support frame of the present invention.
Figure 4:
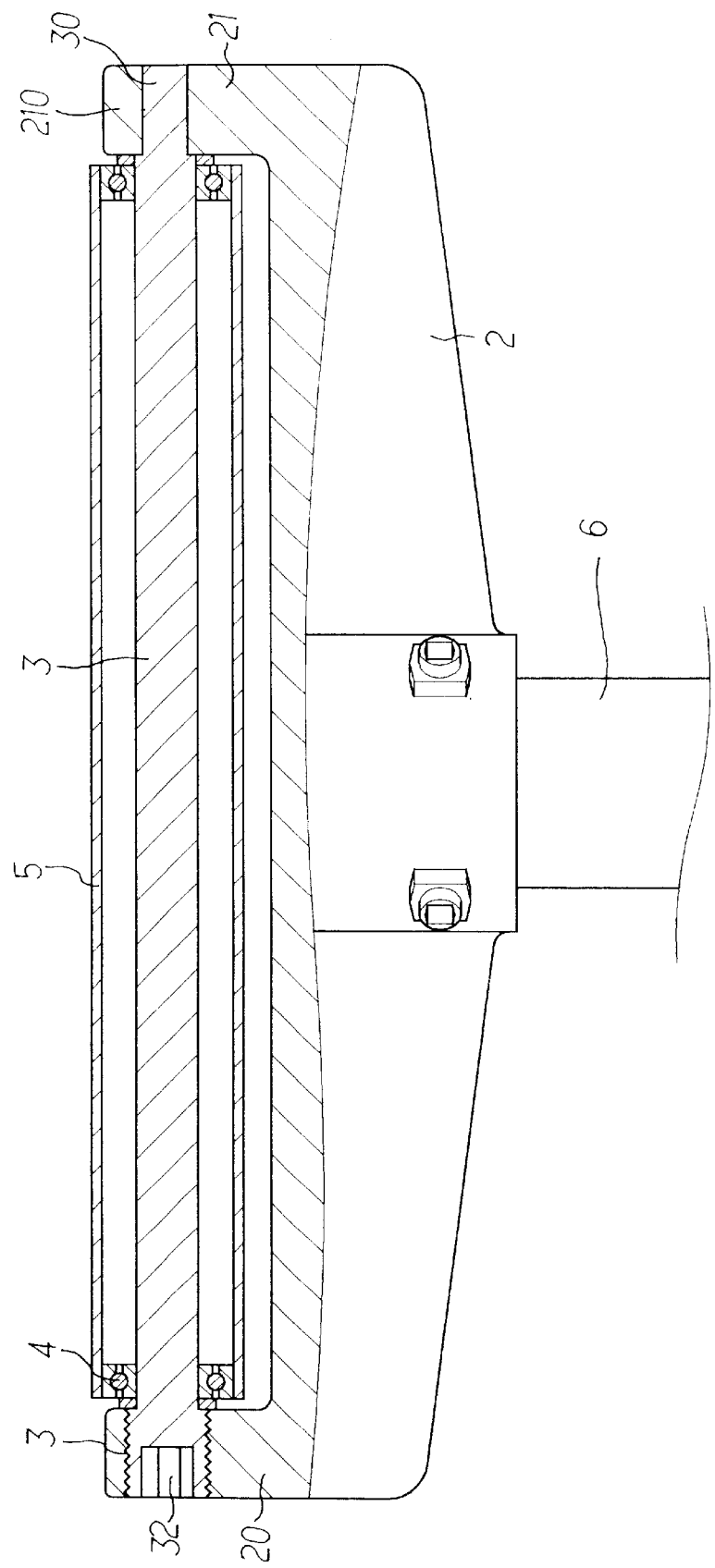
FIG. 4 is a side elevational view, partly in section, of a roller type support frame of the present invention.

Referring to FIGS. 3 and 4, the roller type support frame in accordance with the present invention comprises a body 2 having a neck 22 extending from an intermediate position of the body 2. A first end piece 20 and a second end piece 21 respectively extend from the body 2 and toward an opposite direction of the neck 22. The neck 22 has at least one radial threaded hole 220 defined therein and a post 6 is inserted into the neck 22. A bolt 221 extends through the at least one radial threaded in hole 220 and contacts the post 6 so as to position the body 2 on the post 6. The first end piece 20 has a threaded hole 200 defined in a side facing the second end piece 21, and the second end piece 21 has a hole 210 defined therethrough.

A core 3 has a first end with a threaded outside 31 and a second end of the core 3 having an insertion section 30 which is inserted into the hole 210 of the second end piece 21. The threaded outside 31 is engaged with the threaded hole 200 in the first end piece 20. A polygonal recess 32 is defined in the first end of the core 3 so that an assembler can use a wrench to engage with the polygonal recess 32 to rotate the core 3 conveniently. A sleeve 5 is rotatably mounted to the core 3 with two bearings 4 connected between the core 3 and the sleeve 5.

By the present invention, the end pieces 20, 21 are made to be one piece member so as to have better structural strength and the core 3 is easily to be connected between the two end pieces 20, 21.

FIG. 5 shows that the roller type support frame may be made to have a V-shaped body 20 with a protrusion 30 extending from an mediated position of the body 2 and two end pieces 20 on two ends of the body 2. Two sets of the core 3 and the sleeve 5 are respectively connected between the protrusion 30 and the two end pieces 20.

While we have shown and described various embodiments in accordance with the present invention, it should be clear to those skilled in the art that further embodiments may be made without departing from the scope and spirit of the present invention.

What is claimed is:

1. A roller type support frame structure comprising:
   a body having a neck adapted to be connected to a post, a first end piece and a second end piece respectively extending from said body, said first end piece having a threaded hole defined in a side facing said second end piece, said second end piece having a hole defined therethrough;

a core having a polygonal recess defined in a first end thereof which has a threaded outside and a second end of said core having an insertion section which is inserted into said hole of said second end piece, said threaded outside engaged with said threaded hole in said first end piece, and a sleeve rotatably mounted to said core.

2. The roller type support frame structure as claimed in claim 1, wherein said neck has at least one radial threaded hole defined therein so that a bolt extends through said at least one radial threaded hole and is adapted to contact the post.

* * * * *